Nov. 1, 1932.   G. H. THACHER   1,886,315
VALVE
Filed July 21, 1931

INVENTOR
George H. Thacher
BY Rolt. P. Hains
ATTORNEY

Patented Nov. 1, 1932

1,886,315

UNITED STATES PATENT OFFICE

GEORGE H. THACHER, OF MELROSE, MASSACHUSETTS

VALVE

Application filed July 21, 1931. Serial No. 552,089.

This invention relates to emergency valves constructed to close automatically in case of fire, and adapted for use in pipe lines for combustible fluids.

Pipe lines are extensively used to supply illuminating gas to buildings, to deliver liquid fuel to furnaces and to carry other combustible fluids in and near buildings. These fuel pipe lines constitute an increased hazard in the case of fire, since if any portion of a pipe line supplied with combustible fluid is broken a continuous stream of liquid or gaseous fuel will be released to increase the conflagration.

It has been proposed heretofore to provide fuel conducting pipe lines with emergency valves that will operate automatically in the case of fire to shut off the supply of fuel, but in many of the prior constructions the reliability of a soldering operation has been depended upon to hold the valve open and to release the valve at the desired temperature, while other proposed constructions have been provided with exposed operating parts that are likely to be tampered with or otherwise rendered inoperative during their long period of use.

The present invention relates to an extremely simple, compact and reliable valve construction in which all operating parts are contained within the valve casing where they cannot be tampered with and are protected from dust, rust and other injurious agents.

One important feature of the present invention resides in an automatically closing valve adapted to be held in its open position by threaded elements, one of which is formed of solder, the arrangement being such that the valve is positively locked or clamped in its open position but will close automatically in case of fire which will melt or fuse the solder.

Another important feature resides in a small hollow lug that extends outwardly from the valve casing so that it is exposed at all sides and will be quickly heated in case of fire to fuse the valve holding solder confined therein and permit the automatically operated valve to close.

A further feature of the invention resides in a guide tube adapted to slidably receive the valve stem and guide the valve throughout its movement from the open to the closed position.

A more specific feature of the present invention resides in a small threaded ring or nut formed of solder and adapted to be clamped in a hollow boss or pocket of the valve casing, the arrangement being such that the valve is positively held in its open position by screwing its threaded stem into the solder nut which is clamped in the boss or pocket. As a result of this construction it is unnecessary to solder the stem of the valve in the boss or pocket, and consequently all danger of the valve being accidentally released through a defect in the soldering operation is avoided.

Other features of the invention and novel combination of parts in addition to the above will be hereinafter described in connection with the accompaying drawing which illustrates one good practical form thereof.

In the drawing:—

Fig. 1 is a front elevation illustrating the pipe line to a gas meter as provided with the valve of the present invention;

Fig. 2 on an enlarged scale is a side elevation of the valve of the present invention;

Figure 1:
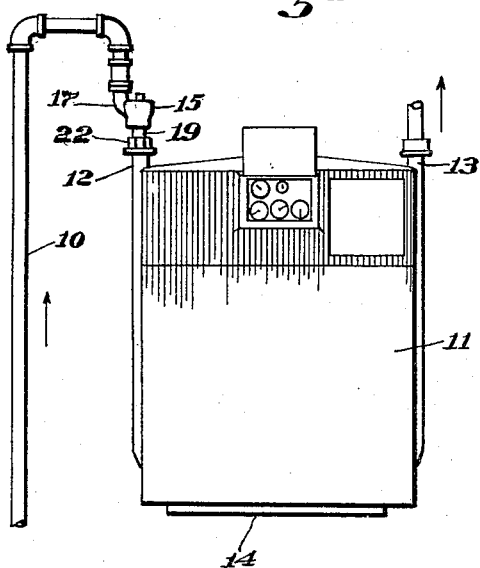
Figure 2:
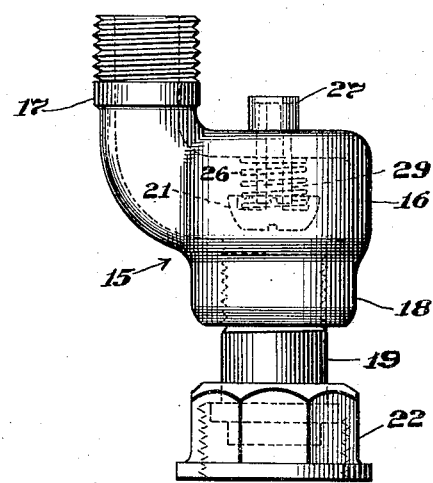
Figure 4:
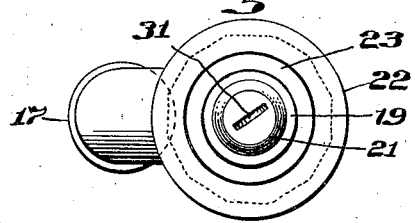
Fig. 4 is a bottom plan view of Fig. 2.

The valve of the present invention is shown as connected to the inlet gas pipe line for the ordinary gas meter installed in many homes. It will be understood, however, that the present valve may be used in practically any pipe line employed to carry combustible gases or liquids and will operate to cut off the flow of fluid through the pipe line in case of fire.

In the embodiment of the invention illustrated 10 is the gas inlet pipe line, such as commonly provided to carry illuminating gas from the gas main in the street to the gas meter 11 located in the basement of a house or in any other desired place. The meter which may be of well known construction has the usual gas inlet connection 12 and outlet connection 13 and the meter is shown as resting upon the support 14.

The emergency valve of the present invention is preferably connected to the inlet pipe 10 in position to shut off the gas, in case of fire, before it reaches the meter 11, and is shown as comprising the casing 15 having the enlarged cylindrical portion 16 in which the automatically closing valve, to be described, is normally held in its open position. At one side of the cylindrical portion 16 is provided the threaded inlet 17 adapted to be secured to the fluid supply pipe 10, and extending downwardly from the cylindrical portion 16 of the casing is the internally threaded outlet 18 of reduced diameter.

The features of the present invention may, however, be employed in connection with valve casings of various shapes and configurations, but it is highly desirable that the casing 15 be formed as an integral structure having no openings other than the one inlet opening and the one outlet opening above described, to thereby avoid the danger of the valve casing developing a leak throughout its long period of use.

In the construction shown a threaded sleeve 19 is screwed into the internally threaded outlet 18, the arrangement being such that the inner end 20 of the sleeve 19 constitutes a seat for the valve 21. The outer end of the sleeve 19 is conveniently provided with the coupling nut 22 which rests upon the annular shoulder 23 of the sleeve, and the coupling nut 22 may be secured directly to the inlet connection 12 of the meter 11.

The valve 21 is shown as mushroom shaped and has the central stem 24, the outer end of which is preferably threaded as at 25, and the valve 21 is continuously urged toward its seat 20 by a coiled spring 26, one end of which is seated in the hollow portion of the valve, while the other end of the compressed spring rests against an inner wall of the valve casing, as shown.

Figure 3:
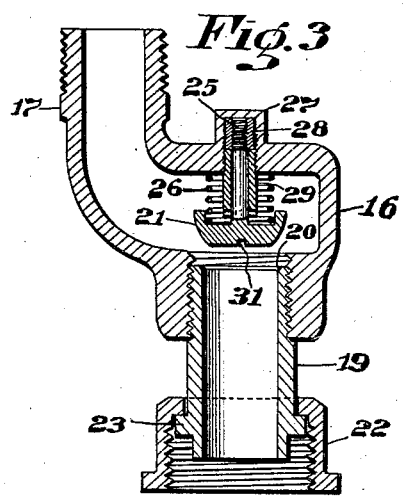
Fig. 3 is a vertical sectional view of Fig. 2 showing the valve open.

The construction of the emergency valve of the present invention is such that the valve 21 will be positively held in its open position of Fig. 3 indefinitely, provided no fire occurs, but will be sure to close and stop the flow of combustible fluid in case of fire.

To secure this desired operation, the valve casing 15 in accordance with the present invention, is provided with a pocket or outwardly extending hollow boss 27, adapted to contain the solder employed to hold the valve 21 in its open position. The walls of this hollow boss are preferably thinner than the walls of the casing 15, so that the solder within the boss will fuse quickly in case of fire.

The present construction, while employing solder to hold the stem 24 within the hollow boss 27, secures this result without the necessity of soldering the stem in the boss. This is accomplished by providing the threaded ring or nut 28 formed of solder, preferably of low fusing point, and which is adapted to receive the threaded stem 24.

Figure 5:
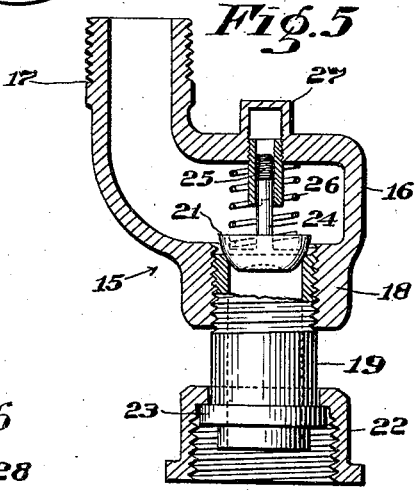
Fig. 5 is a view similar to Fig. 3 showing the valve closed.
Figure 6:
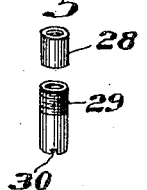
Fig. 6 is a perspective view of a ring and sleeve to be described.

The solder ring 28 is positively held in the boss 27 by the sleeve 29 which is threaded at one end and is adapted to be screwed into the threaded portion of the boss or pocket 27, as will be apparent from Figs. 3 and 5. The sleeve 29 is relatively long, as shown, and serves not only to clamp the nut 28 in the boss 27, but also to cooperate with the stem 24 to guide the valve 21 throughout the valve movement. The sleeve 29 is preferably provided with a slot 30 adapted to receive a screw driver, so that the sleeve may be screwed tightly into the boss 27, and the valve 21 is preferably provided with the slot 31 adapted to receive a screw driver to screw the valve stem into the solder nut 28 clamped within the boss 27.

It will be seen from the foregoing that through the employment of the solder ring 28 the valve 21 is positively held in its open position until such time as the boss 27 may be heated sufficiently to melt the solder, whereupon the valve will close as shown in Fig. 5, under the action of the spring 26. The stem 24 fits loosely in the sleeve 29 and the melted solder may pass downwardly into the cup-shaped portion of the valve 21.

It will also be understood that all operating parts of the present emergency valve are housed within the casing where they are well protected, and that the valve will close with certainty in case of fire, and also that the parts may be quickly and easily assembled by screwing them together.

What is claimed is :—

1. An emergency valve adapted to close automatically in case of fire, comprising a valve casing having a valve seat and an outwardly projecting hollow boss, a valve within the casing, a valve stem projecting from the valve and provided with a solder nut secured in said boss to hold the valve open but in position to close automatically in case the solder is melted.

2. An emergency valve adapted to close automatically in case of fire, comprising a valve casing having a valve seat, a valve within the casing, and means within the casing for holding the valve open including a threaded element formed of solder and connected by its threads to the valve to maintain the valve open but in position to close automatically in case the solder is melted.

3. An emergency valve adapted to close automatically in case of fire, comprising a valve casing having a valve seat, a valve within the casing and provided with a stem, a solder element secured to said stem, and threaded means for securing the solder element to a portion of the casing to hold the valve open but in position to close automatically in case the solder is melted.

4. An emergency valve adapted to close automatically in case of fire, comprising a valve casing having a valve seat and a pocket formed in the inner side of a wall of the casing, a valve within the casing and provided with a stem, a solder element secured to said stem, and a threaded member for securing the solder element in said pocket to hold the valve open but in position to close automatically in case the solder melts.

5. An emergency valve adapted to close automatically in case of fire comprising a valve casing having a valve seat and a threaded pocket formed in the inner side of a wall of the casing, a valve within the casing and provided with a threaded stem, a solder element adapted to be screwed onto the threaded stem, and a threaded member adapted to be screwed into said threaded pocket to secure the solder element in said pocket to hold the valve open but in position to close automatically in case the solder melts.

6. An emergency valve adapted to close automatically in case of fire, comprising a valve casing having a valve seat and a pocket formed in the inner side of a wall of the casing, a valve within the casing, a solder nut adapted to fit within said pocket, means for securing the solder nut in said pocket, and a threaded stem extending from the valve and adapted to be screwed into the solder nut to hold the valve open but in position to close automatically in case the solder melts.

7. An emergency valve adapted to close automatically in case of fire, comprising a valve casing having a valve seat and a hollow outwardly projecting boss, a spring operated valve within the casing, a solder nut adapted to fit within the hollow boss, means for securing the solder nut in said boss, and a threaded stem extending from the valve and adapted to be screwed into the solder nut to hold the valve open but in position to be closed by its spring in case the solder melts.

8. An emergency valve adapted to close automatically in case of fire, comprising a valve casing having a valve seat and an internally threaded pocket formed in the inner side of a wall of the casing, a valve within the casing provided with a threaded stem, a solder nut threaded to receive said stem, a stem receiving sleeve adapted to be screwed into said pocket to clamp the solder nut therein and guide said stem so that the valve stem may be screwed into said nut to hold the valve open but in position to close automatically in case the solder melts.

In testimony whereof, I have signed my name to this specification.

GEORGE H. THACHER.